2,806,474
PRODUCTION OF FILTER ELEMENTS

Victor Emmanuel Yarsley, Hook, England

No Drawing. Application June 23, 1954,
Serial No. 438,877

Claims priority, application Great Britain June 29, 1953

7 Claims. (Cl. 131—10)

This invention relates to improvements in and relating to filter elements.

It has been suggested to use cellulose acetate in the form of film, foil or fibres to absorb tars and nicotine from cigarette smoke, and this is logical having regard to the fact that nicotine has a solvent action for cellulose acetate both of the conventional acetone-soluble variety and also high acetyl cellulose acetate which approximates to the triacetate.

I have found that the ability of cellulose acetate to act as a filter for the cigarette smoke depends to a considerable extent on the nature of the surface. In the case of cellulose acetate which is prepared as a film, foil or fibres by evaporation of an acetone or other suitable solution, the almost smooth continuous surface of the foil gives a surface of low absorptivity. By contrast if the cellulose acetate is in the form as conventionally obtained on the commercial scale, by precipitating a solution of the ester in glacial acetic acid, then a material is obtained which is opaque white, and has a surface which is pitted and can best be described as amorphous, although this term is not strictly true in the physical sense. The net result is that with cellulose acetate so prepared the surface/mass ratio is considerably higher than in the case of cast film, cut sheet or spun fibres. The surface can be regarded as "activated," that is, it is in a highly receptive state to pick up and condense vapours or particulate clouds passing over it.

Accordingly the invention provides a filter tip cigarette having a filter element consisting at least in part of "active" cellulose acetate flake, i. e. cellulose acetate precipitated in flocculent form from solution in a solvent, by the addition of a liquid in which the cellulose is at most sparingly soluble, for example water, a hydrocarbon solvent such as benzene, toluene or xylene, a low molecular weight aliphatic alcohol such as ethyl alcohol, a chlorinated hydrocarbon such as carbon tetrachloride or an ether such as dimethyl ether, methyl ethyl ether or diethyl ether.

The preferred solvent is acetic acid, and the precipitated cellulose acetate flake is preferably washed to free it from acid. It is preferred to use a cellulose acetate having an acetyl value expressed as 52 to 54% of combined acetic acid. Other solvents which may be used for this cellulose acetate include acetone and a mixture of acetone and methyl alcohol.

The filter element may be in the form of a cylinder constituted by particles of "active" cellulose acetate flake bonded together substantially at their points of contact only.

In one method of making the filter element particles of "active" cellulose acetate flake are sprayed with an aqueous solution of a water-soluble adhesive and extruded as a cylindrical rod, and the rod is dried and cut into cylinders of the desired length. Suitable water-soluble adhesives are starch, feculose and methyl cellulose.

In a modification of this method, particles of "active" cellulose acetate flake are mixed with a water-soluble adhesive in fine powder form exposed to a humid atmosphere until sufficient water vapour has been absorbed to dissolve the adhesive, and extruded as a cylindrical rod, and the rod is dried and cut into cylinders of the desired length.

In yet another method, particles of "active" cellulose acetate flake are treated with the vapour of a volatile solvent for cellulose acetate to dissolve the surface of the particles only and extruded as a cylindrical rod into water, and the extruded rod is dried and cut into cylinders of the desired length.

In all cases the aim must be to give sufficient bonding of the particles of the "active" cellulose acetate flake, without too greatly reducing the porosity of the mass and without impairing the activity of the surface of the flake. For this reason, the proportion of water-soluble adhesive or volatile solvent must be small, and the mass must be extruded under not too high a pressure through an orifice of a diameter appropriate to the cigarette in which the finished filter element is to be incorporated. When a volatile solvent is employed, the extruded rod must be treated with water to re-precipitate the cellulose acetate in the "active" form.

I have found that it is advantageous to sieve the cellulose acetate flake before use, and to use according to the requirements of the filter element, coarse or fine cellulose acetate particles, but uniformly so. Quite apart from the uniformity and efficiency of the filtration I find that the efficiency of bonding the cellulose acetate flake into a constituted tip is also increased when the filter elements are constituted of cellulose acetate of reasonably uniform flake size.

The following examples illustrate the production of the filter elements:

Example 1

A charge of "active" cellulose acetate flakes of 53–54 acetyl value, sieved to 15 standard mesh, was placed in the barrel of a piston type extruder; the diameter of the barrel is appropriate to that of the cigarette to which the filter element is to be attached. Acetone vapour was passed through the charge in the barrel for ten minutes to promote adhesion between the flakes at their points of contact. The charge was then extruded into a water bath in the form of a rod. The rods formed in this manner were allowed to remain in the water for 15 minutes to ensure that any surfaces softened by the acetone vapour were re-precipitated in the "active" form. The rods were then removed from the water bath, dried by heating at 80° C., for one hour, and cut into lengths suitable for use in the manufacture of filter tip cigarettes.

Example 2

A charge of cellulose acetate flakes of 53–54 acetyl value, sieved to 20 standard mesh, was placed in a rotating drum and sprayed with a 5% solution of methyl cellulose in water. The spraying was continued until the amount of adhesive present on the flakes was approximately 6% by weight. The flakes were then extruded in the form of a rod through an extrusion nozzle on to a conveyor belt moving through a drying chamber. The diameter of the rod, controlled by the size of the nozzle, is appropriate to the diameter of the cigarette to which the filter element is to be attached. During the passage through the drying chamber the individual flakes in the rod are bonded firmly by the adhesive. After leaving the drier the rod is cut into lengths suitable for manufacture into filter tip cigarettes.

Example 3

A charge of cellulose acetate flakes of 53–54% acetyl value, sieved to 15 standard mesh, was placed in a rotary drum together with 10 percent (on the weight of the flakes) of powdered methyl cellulose. The drum was rotated and the charge allowed to mix for 1 hour.

The composition was then placed in the barrel of a piston type extruder, the diameter of the barrel corresponding to that of a cigarette. Steam under atmospheric pressure was passed through the barrel to moisten the methyl cellulose particles and the charge was extruded in the form of a rod. The operations were repeated and the rods formed in this manner were dried at 90° C. and cut into the required lengths.

In the appended claims the term "active" cellulose acetate flake means cellulose acetate precipitated in flocculent form from solution in a solvent.

What I claim is:

1. A filter tip cigarette having a filter element consisting at least in part of "active" cellulose acetate flake.

2. A cigarette filter tip element constituted by a cylindrical body of particles of "active" cellulose acetate flake bonded together substantially at their points of contact only.

3. A tobacco-smoke filter consisting essentially of flakes of "active" acetone-soluble cellulose acetate agglomerated into a porous mass as the result of mutual adherence of said flakes at their points of contact.

4. A filter as defined in claim 3 in which the mutual adherence is obtained by a binder of cellulose acetate.

5. A filter as defined in claim 3 in which the mutual adherence is secured by means of a binder of methyl cellulose.

6. A tobacco-smoke filter consisting essentially of cellulose acetate flakes bonded together into a porous mass substantially only at their points of contact, said flakes having a greater surface to mass ratio than smooth cast films, cut sheets and spun fibers and rough surfaces activated to a high state of absorptivity.

7. A tobacco-smoke filter according to claim 6, in which the cellulose acetate flakes are of substantially uniform flake size.

References Cited in the file of this patent

UNITED STATES PATENTS

| | | |
|---|---|---|
| 2,228,383 | Berl | Jan. 14, 1941 |
| 2,242,372 | Schneider | May 20, 1941 |
| 2,258,823 | Tarrant | Oct. 14, 1941 |
| 2,483,406 | Francis | Oct. 4, 1949 |
| 2,707,308 | Taylor et al. | May 3, 1955 |